United States Patent

[11] 3,621,949

| [72] | Inventor | Byron L. Watson<br>Dayton, Ohio |
| [21] | Appl. No. | 862,654 |
| [22] | Filed | Oct. 1, 1969 |
| [45] | Patented | Nov. 23, 1971 |
| [73] | Assignee | General Motors Corporation<br>Detroit, Mich. |

[54] MODIFIED ROD GUIDE FOR CUT OFF SHOCK ABSORBER
3 Claims, 5 Drawing Figs.

[52] U.S. Cl. ............................................. 188/284,
188/322
[51] Int. Cl. ............................................. F16f 9/36
[50] Field of Search .................................. 188/281,
284, 322

[56] References Cited
UNITED STATES PATENTS
| 3,057,441 | 10/1962 | Pribonic et al. | 188/281 |
| 3,187,847 | 6/1965 | Karlgaard | 188/317 |

FOREIGN PATENTS
| 678,804 | 9/1952 | Great Britain | 188/322 |
| 919,748 | 2/1963 | Great Britain | 188/322 |
| 960,044 | 6/1964 | Great Britain | 188/281 |

Primary Examiner—George E. A. Halvosa
Attorneys—W. S. Pettigrew and J. C. Evans

ABSTRACT: In preferred form, a double direct acting hydraulic shock absorber having a piston rod, a rod guide closing one end of a pressure cylinder and a piston dividing the cylinder into variable volume rebound and compression compartments. The rebound and compression compartments are communicated through an axial rod flow path defined by a side opening in the piston rod, a concentric bore through one end of the piston rod and control valves within the piston. When the rebound chamber is cut off a high-pressure buildup occurs in the cylinder. The rod guide is modified to include an annular high-pressure trap which prevents blowby of such high-pressure fluid past a resilient fluid seal that is operative during normal operation to prevent fluid leakage exteriorly of the unit along the outer periphery of the piston rod.

INVENTOR
Byron L. Watson
BY J.C. Evans
ATTORNEY

INVENTOR.
Byron L. Watson
BY
J.C. Evans
ATTORNEY

MODIFIED ROD GUIDE FOR CUT OFF SHOCK ABSORBER

This invention relates to double direct acting hydraulic shock absorbers and more particularly to such units having a rebound cut off which is produced by control of fluid flow through aligned openings in the piston rod of the unit.

In certain automobile shock absorbers it is desirable to control the extent of rebound movement of the piston rod outwardly of the shock absorber cylinder as produced when the automobile chassis moves upwardly of the ground engaging or unsprung mass components of the suspension.

One such rebound control system is found in a double direct acting hydraulic shock absorber which has a pressure cylinder divided into a rebound and a compression compartment by a piston member. One end of a piston rod connects to the piston and the opposite end thereof is directed through a rod guide that maintains the rod in axial alignment with the pressure cylinder and also serves to close one end of the pressure cylinder.

In this arrangement the pressure cylinder is completely filled with hydraulic fluid and cut off is produced by preventing flow of hydraulic fluid through a concentric bore in the piston rod and a side opening therein which communicates with the rebound chamber.

The concentric bore communicates with the interior of the piston in which is located a plurality of control valve components for producing a predetermined dampening action on both rebound and compression strokes of the piston rod with respect to the pressure cylinder.

The rod guide which supports the piston rod also serves as a housing for a pressure seal which is characterized by having a plurality of axially spaced, annular lips thereon that engage the outer periphery of the piston rod to seal against hydraulic fluid leakage during normal operation. The seal is maintained against the periphery of the rod by spring means which space the underside of the seal from an upper surface on the rod guide to define an open space in communication with a reservoir for the hydraulic fluid.

The multilip seal is suitable to seal against rod leakage under normal shock operation. Under conditions where the rebound cutoff comes into play there is a substantial pressure buildup within the rebound chamber produced by the side opening in the hydraulic flow path being shutoff as it enters the rod guide of the unit. This pressure cannot always be sealed by the multilip seal, especially when lateral forces are applied to the rod.

An object of the present invention is to improve a rod flow-type rebound cutoff shock absorber of the type having a rebound chamber sealed by a rod guide and a multilip seal circumferentially engaging the piston rod at a point spaced above the rod guide by the provision of means interposed between the rebound chamber and the seal to prevent high-pressure blowby of the seal during rebound cutoff.

A further object of the present invention is to provide means in the rod guide that will prevent hydraulic leaks from the unit during rebound operation without modifying details of a resilient multilip rod seal or the basic form of a rod guide which is formed to close the pressure cylinder; to define a cavity for the seal; and to guide the piston rod against lateral movement with respect to the pressure cylinder.

Yet another object of the present invention is to prevent excessive oil leakage from a shock absorber having means for trapping fluid between the piston of the unit and a piston rod guide at the end of a rebound stroke and to do so by disposing a high-pressure trap between the rebound chamber of the unit and the underside of a multilip seal circumferentially engaging the piston rod, the trap being operative to prevent high-pressure oil from bridging an open space below the seal during rebound cutoff action.

Figure 1:
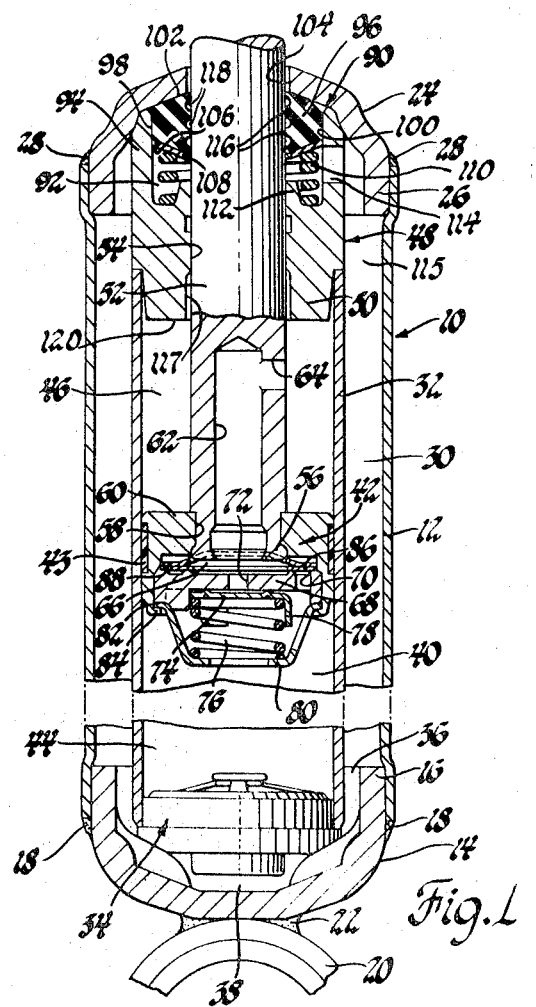
FIG. 1 is a vertical sectional view of a shock absorber partially broken away, including the present invention.

Referring now to the drawings in FIG. 1, a double direct acting hydraulic shock absorber 10 as illustrated of the type including an exterior cylinder 12 that is closed at its bottom end by a cup shaped end cap 14 having an upstanding peripheral flange 16 thereon fastened to the lower end of the cylinder 12 by suitable means such as a weld 18.

A mounting ring 20 is welded to the base of the cup 14 at 22 and the ring 20 is adapted to be connected to suitable means on an unsprung mass of a vehicle for example the rear axle housing thereof.

The opposite upper open end of the cylinder 12 is closed by a cup-shaped cap 24 which has an inverted flange section 26 thereon joined to the upper end of the cylinder 12 by suitable means such as weld 28.

Together the cylinder 12 and caps 14, 24 combine to form a reservoir space 30 of annular form around a pressure cylinder 32.

The bottom end of the pressure cylinder 32 is closed by a base valve assembly 34 of the type more specifically set forth in U.S. Pat. No. 3,038,560 to Paul Long et al. The base valve 34 includes means for controlling flow from the reservoir 30 through flow passageways 36 formed between the flange 16 and the outer surface of the pressure cylinder 32 at the bottom end thereof. The flow passageways 36 communicate with an open space 38 below the base valve 34. The base valve 34 will selectively control fluid flow from the open space 38 to and from the interior 40 of the pressure cylinder 32.

As is the case with double direct acting hydraulic shock absorbers the interior 40 of the pressure cylinder 32 is filled with a suitable hydraulic fluid that coacts with orifices within the base valve 34 to produce part of the dampening action. Moreover, the hydraulic fluid partially fills the reservoir 30.

A piston 42 is supported within the cylinder 32 for relative reciprocating movement with respect thereto. It has a peripheral sleeve seal 43 that engages the inside surface of the cylinder 32 to divide it into a variable volume compression chamber 44 below the piston and a variable volume rebound chamber 46 above the piston. A rod guide 48 has a depending shoulder 50 thereon which fits into the upper open end of the pressure cylinder 32 for defining the top of the variable volume chamber 46. A piston rod 52 extends through a concentric bore 54 within the rod guide 48 and has one end connected by hot upsetting at 56 around a concentric opening 58 through the top 60 of the piston 42.

In the illustrated arrangement the piston rod includes a concentric bore 62 through the piston connected end thereof. It is communicated by a side opening 64 with the rebound chamber 46.

The bore 62 in turn communicates with a space 66 above a valve plate 68 through which extends a plurality of peripheral circumferentially spaced openings 70 (one shown) and a central aperture 72. The aperture 72 is covered by an orificed valve disc 74 that is maintained seated against the underside of plate 68 by a coil spring 76 held at one end by tabs 78 on the disc 74 and on the opposite end thereof by a perforated cage element 80 that has the upper continuously circumferentially formed edge 82 thereof connected to the piston 42 by a spun over edge 84 on the base thereof.

Flow through the peripheral openings 70 through the valve plate 68 is controlled by an annular orificed disc 86 which is held in seated relationship with the plate 68 by a multifingered leaf spring element 88 to close openings 70.

For a more detailed explanation of the valving components and their operation reference may be had to U.S. Pat. No. 3,187,847 to Karlgaard.

For purposes of the present invention it is only necessary to point out that on a compression stroke the piston rod 52 enters the fluid filled pressure cylinder 32 and a volume of fluid equal to the volume of the piston 52 entering the chamber 32 is displaced through the base valve assembly 34 into the reservoir space 30.

During the compression stroke the rate of movement of the sprung mass toward the unsprung mass is controlled by the damping action of viscous fluid flow across the orifice openings in the valve disc 86 and by flow of fluid through orifices (not shown) in the base valve 34. During this movement, in addition to the displaced fluid flow into the reservoir 30, there is a flow of fluid from the compression chamber 44 into the rebound chamber 46 through the openings 70, across the valve disc 86 thence through the concentric rod bore 62 and the side opening 64.

On a rebound stroke the piston 42 moves upwardly in the pressure cylinder 32 and as the volume of the piston rod 52 moves exteriorly of the pressure cylinder 32 make up fluid from the reservoir 30 flows across the base valve 34 into the compression chamber 44.

Concurrently, fluid flows from the rebound chamber 46 through the side openings 64, the concentric bore 62 thence through the central aperture 72 in the valve plate 68 and across the valve disc 74 into the compression chamber 44. The spring 76 and orifices (not shown) in the valve disc 74 establish a predetermined rebound dampening force in the order of 200 pounds of force that resists separating movement between the sprung and unsprung mass of the vehicle during normal low frequency, low-amplitude movements of the type that are commonly produced by a vehicle moving over a smooth pavement. This will cause only a slight movement of the piston 42 on either side of a centered position within the cylinder 32. During this phase of operation normal pressures in the rebound chamber are in the order of 200–400 p.s.i.g.

During this phase of operation a seal assembly 90 that is located within an open space 92 defined by an upwardly directed peripheral flange 94 on the rod guide 48 serves to prevent leakage of hydraulic fluid from the shock absorber.

More particularly, the seal assembly 90 includes an annular seal member 96 of resilient material, for example, a synthetic rubber having a Durometer Hardness (Shore A) of 80. It has an outer peripheral surface 98 press fit into an open upper end 100 of the guide 48. The seal member 96 further includes an upper annular surface 102 that sealingly engages the underside of the top cap 24 adjacent and in surrounding sealing relationship to an opening 104 through the cap 26 through which passes the movable piston rod 52.

The seal further includes an annular under surface 106 which is supported by a washer 108 which is spring biased upwardly by a coil spring 110.

The coil spring 110 is centered about an upwardly extending hub 112 formed on the upper surface of the rod guide 48 in surrounding relationship to and extending longitudinally along the length of the piston rod to a level within the open space 92 which is at the bottom of a side relief port 114 which communicates the space 92 with an air space 115 formed in the reservoir 30 to accommodate the changes in the amount of fluid displaced from the pressure cylinder 32 by the movement of the piston rod 52 with respect to the pressure cylinder 32 during the compression and rebound strokes.

The seal 96 is further characterized by having a plurality of radially inwardly directed lips 116 that are axially spaced along the outer surface of the piston rod 52 and separated from one another by grooves 118.

During normal operation of the shock absorber fluid leakage along the outer periphery of the rod 52 caused by the 200–400 p.s.i.g. pressure is rebound compartment 46 will flow into the space 94 beneath the washer 106 where it will collect around the raised hub 112 to drain through the port 114 back into the reservoir 30. The buildup of the level of the oil leakage within the space 94 does not flood the grooves 118 between the lips 116 and as a result, there is little or no leakage during such normal operation.

In accordance with certain principles of the present invention there is, because of the rod flow characteristics of the shock absorber, a phase of operation wherein relatively high-pressure conditions exist in the rebound chamber 46.

Figure 2:
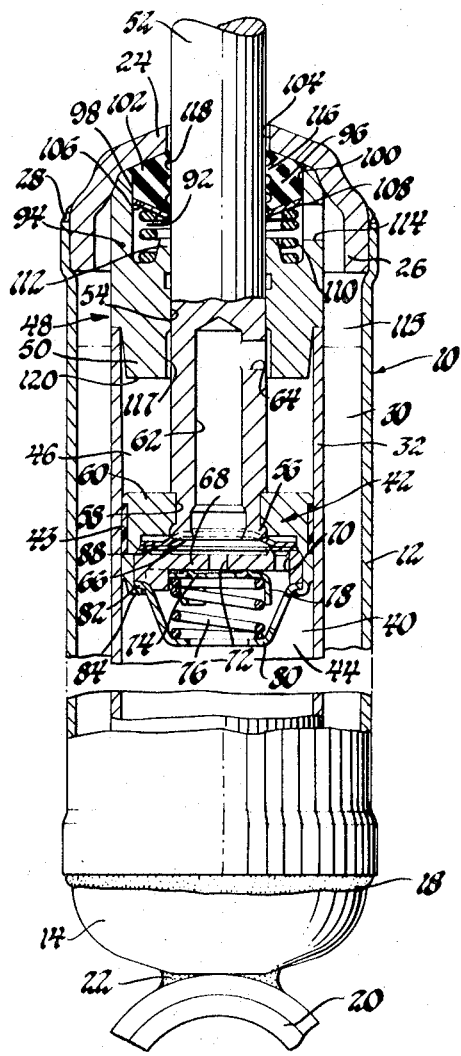
FIG. 2 is a view partially in elevation and partially in vertical section showing an operative position of the unit just prior to rebound cutoff.

More particularly, as seen in FIG. 2, during the end of an extreme rebound movement the piston rod 52 is moved with respect to the rod guide 48 so that the side opening 64 will enter an entrance segment 117 of the bore 54 that has a diameter greater than the OD of the piston rod 52. At this time there is a first restriction of fluid flow into the side port 64, and an increase in force is required to move the piston rod 52 interiorly of the cylinder 32.

At the end of a rebound stroke the side opening 64 enters an intermediate bore segment 119 of the bore 54 that constitutes a journal for supporting the rod 52 against lateral movement as it is reciprocated into and out of the pressure cylinder 32.

As the side opening 64 enters the bore segment 119 fluid from the rebound chamber 46 no longer flows through the side opening 64 for series passage through the concentric bore 62 and fluid flow components within the piston 42. The fluid trapped between the piston 42 and a bottom surface 120 on the rod guide 42 constitutes a hydraulic lock against further outward movement of the piston rod 52 which produces a rebound movement cutoff function.

However, there is a clearance 122 between the OD of the piston rod 52 and the segment 119 through which hydraulic fluid from the rebound chamber 46 can be forced under extreme pressures into the open space 92 beneath the resilient seal 96.

Figure 5:
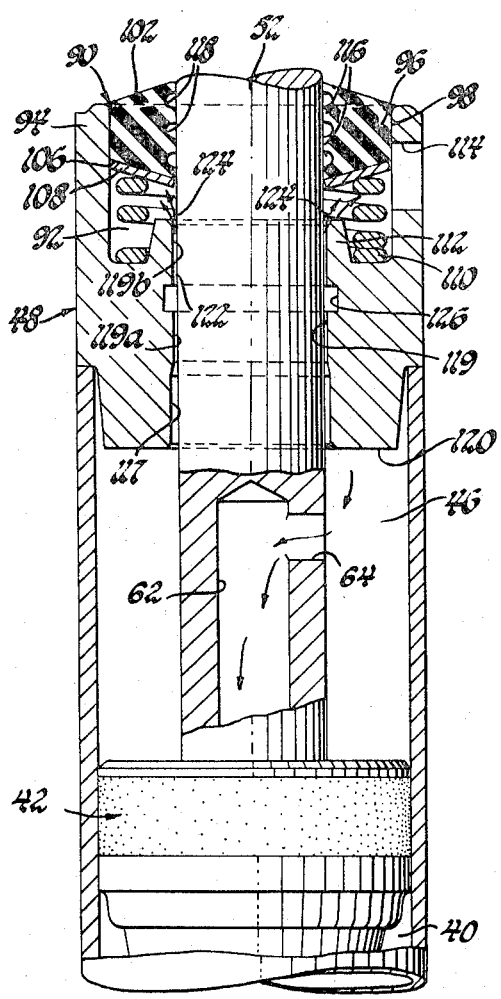
FIG. 5 is a fragmentary, enlarged vertical sectional view of the rod guide and a piston rod seal in the present invention.

With lateral forces acting on the piston rod 52 it has been observed that at times a high-pressure jet can pass through the clearance 122 as shown in FIG. 5. The jet flow illustrated at 124 in FIG. 5 acts against the underside of the seal 96 and may flood the seal grooves 118 because of a substantial leakage of fluid from the rebound chamber 46 during this phase of operation.

In accordance with certain principles of the present invention to prevent this excessive leakage from occurring a pressure trap is provided between the rebound chamber 46 and the open portion of the space 94 beneath the resilient seal assembly 90.

In the illustrated embodiment the trap takes the form of an annular groove 126 which is formed approximately at the midpoint of the length of the bore segment 119.

The location of the groove 126 is such that the greatest part of the bore segment 119 is retained for giving adequate bearing support for the reciprocating rod 52. As fluid leaks from compartment 46 it passes across the clearance between the outside diameter of the piston rod 52 and a lower surface portion 119a of segment 119. It then enters the side of the groove 126 having the greatest clearance produced by shifting of the piston rod 52 laterally of the segment 119. The fluid then passes through a circular path in the groove 126 and thereafter continues to flow upwardly across clearance between the OD of the piston rod 52 and an upper surface portion 119b of segment 119. The flow across the limited space between surface 119a and the piston rod 52 and the circular or swirl flow through the groove 126 and the additional restriction through the surface 119b all act to cause a controlled flow into the open part of the space 94. It passes over the hub 112 for collection and subsequent flow through the side port 114 without jet action against the underside of the annular seal 96.

In one illustrated arrangement of the invention the rod guide and piston rod have the following dimensional characteristics. The stated dimensions are in turns of lower tolerance figures.

| Item | | Dimension |
|---|---|---|
| Rod Guide 42 | | |
| | $H_1$ | 1.110 inches |
| | $H_2$ | 0.550 inches |
| | $H_3$ | 0.385 inches |
| | $H_4$ | 0.308 inches |
| | $H_5$ | 0.072 inches |
| | $D_1$ | 0.498 inches |

| Piston Rod 52 | $D_1$ | 0.490 inches |
| --- | --- | --- |
| | $D_3$ | 0.022 inches |
| | O.D. | 0.489 inches |

Figure 3:
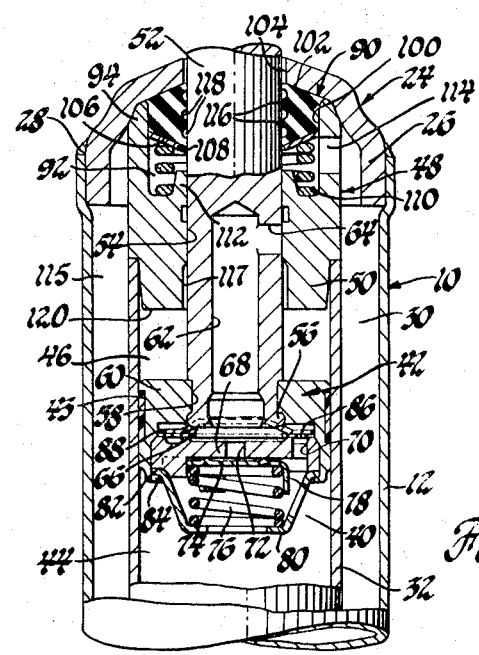
FIG. 3 is a fragmentary vertical sectional view of the shock absorber showing another operative position following a rebound cutoff operation.
Figure 4:
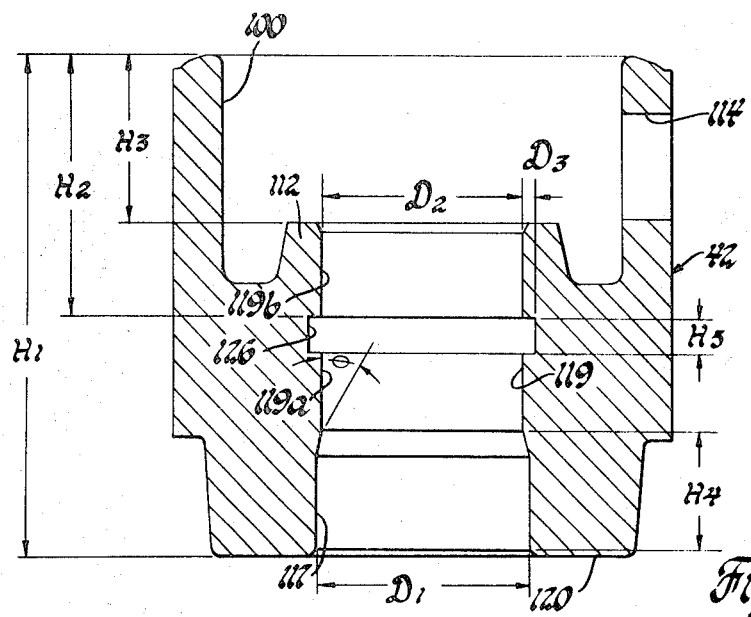
FIG. 4 is an enlarged cross-sectional view of a modified rod guide of the system.

With dimensional characteristics of the aforementioned type under full rebound stroke operating conditions when the vehicle is passed over a surface that produces a full rebound stroke action, and with a hydraulic fluid of a viscosity 8 centistokes at 150° F. pressures are produced in the rebound chamber in the order of 5,000 p.s.i.g. which represents more than a tenfold increase over pressures under normal operating conditions. This occurs when the piston 42 and piston rod 52 are in their cutoff position as shown in FIG. 3. Under these conditions the piston rod seal assembly 90 and the modified rod guide 48 prevent leakage along the piston rod 52.

The aforementioned figures are understood to be merely representative of those commonly found in one preferred mode for use in double direct acting hydraulic shock absorbers for automobiles.

The above arrangement also is operative during normal shock operation to adequately seal against hydraulic shock fluid leakage from the pressure cylinder 32 without producing high-seal gripping forces on the piston rod. This produces a smoother ride control. During normal operation the clearance 122 and groove 126 serves as a flow path for hydraulic fluid from chamber 46 into seal space 92, through port 114 into reservoir 30.

While the embodiment of the present invention, as herein disclosed, constitutes a preferred form, it is to be understood that other forms might be adopted.

What is claimed is:

1. In a double direct acting hydraulic shock absorber having a rebound cutoff for controlling the rate of movement of a piston rod with respect to a pressure cylinder the combination comprising: a piston supported within the pressure cylinder to divide it into rebound and compression chambers, means within said piston for controlling fluid flow between said chambers on the opposite sides of said piston, a piston rod connected to said piston including a concentric bore therethrough, a side opening in said piston rod communicating said concentric bore with said rebound chamber, a rod guide including a depending portion thereon fitted into the upper end of said pressure cylinder for closing it, said rod guide including an upwardly directed flange thereon defining a seal cavity, a cap for closing the upper end of said seal cavity, a concentric bore through said rod guide including a large diameter entrance portion thereon in communication with said rebound compartment, said rod guide bore further including a smaller diameter bearing surface portion thereon extending from said entrance portion into said seal cavity, said piston rod having the peripheral surface thereof supported by said bearing surface against substantial lateral movement with respect to said pressure cylinder, said entrance portion cooperating with said side opening to produce a first rebound cutoff action, said side opening cooperating with said bearing surface to block flow through said rod at the end of its rebound movement thereby to produce a full rebound cutoff when said piston rod has moved a predetermined distance exteriorly of said pressure cylinder, an annular resilient seal element located within the seal cavity in the upper end thereof, means for spring baising said annular resilient seal element against the outer periphery of said piston rod, a plurality of separate sealing lips on said sealing element to maintain a minumum gripping action on said piston rod during reciprocation thereon into and out of said pressure cylinder, said plurality of sealing lips serving to prevent the escape of hydraulic fluid from said rebound chamber during periods when said rebound chamber is communicated with said compression chamber through said rod, said bearing surface having a lower surface portion and an upper surface portion both located axially outwardly of the upper end of said pressure cylinder, an annular groove located between said upper and lower bearing surface portions and having an inner diameter greater than that of said upper and lower bearing surface portions, said annular groove only communicating with said rebound chamber through a clearance between the outer diameter of said piston rod and the inner diameter of said lower bearing surface portion, said annular groove only communicating with said seal cavity through a clearance between the outer diameter of said piston rod and the inside diameter of said upper bearing surface portion, said annular groove and said clearances between said piston rod and said upper and lower bearing portions preventing fluid trapped between said piston rod and said rod guide from blowing through said seal cavity and across said multiple lip sealing element upon the occurrence of a maximum predetermined pressure buildup within said rebound chamber which occurs when said rod side opening is completely blocked by said bearing surface.

2. In a direct double acting hydraulic shock absorber the combination of a pressure cylinder, base valve means communicating one end of said pressure cylinder with a low-pressure reservoir for hydraulic fluid, a rod guide closing the opposite end of said pressure cylinder, a piston located within said pressure cylinder to divide it into first and second variable volume chambers, a piston rod having one end connected to said piston, a concentric bore through said rod guide, the opposite end of said piston rod extending through said concentric bore exteriorly of said pressure cylinder and adapted to be connected to means for reciprocating said piston within said pressure cylinder so as to change the volume of said variable volume chambers on either side thereof, a longitudinal bore through said piston rod, a side opening in said rod communicating said longitudinal bore with one of said chambers, control means within said piston communicating said longitudinal bore with the other of said chambers, said side opening, longitudinal bore and control means defining a serially arranged path for flow of fluid from said first chamber into said second chamber as said piston rod moves exteriorly of said pressure cylinder, said rod guide including a first diameter portion thereon defining a bearing surface engageable with said piston rod for supporting it against substantial lateral movement during reciprocation of said piston with respect to said pressure cylinder, said concentric bore further including an entrance bore section from said first chamber for producing a first predetermined rebound cutoff action as said side opening in said rod moves interiorly of said concentric rod guide bore, means defining a seal cavity above said rod guide, a resilient seal element within said cavity encircling said piston rod and being in sealing engagement therewith, said side opening in said rod being blocked by said piston rod bearing surface at the end of a rebound piston rod stroke to cutoff fluid flow through said serially arranged flow path to produce a rapid pressure increase within said first compartment, said bearing surface having a lower surface portion and an upper surface portion both located axially outwardly of the upper end of said pressure cylinder, an annular groove located between said upper and lower bearing surface portions and having an inner diameter greater than that of said upper and lower bearing surface portions, said annular groove only communicating with said rebound chamber through a clearance between the outer diameter of said piston rod and the inner diameter of said lower bearing surface portion, said annular groove only communicating with said seal cavity through a clearance between the outer diameter of said piston rod and the inside diameter of said upper and lower bearing surface portions, said annular groove in said bearing surface and said clearances between said piston rod and said upper and lower bearing portions operative to trap fluid flow along the outer periphery of said piston rod upon the occurrence of a cutoff produced high-pressure level within said first chamber when said side opening is blocked by said bearing surface to prevent high-pressure jet flow of hydraulic flow from said first chamber against said seal element, said side groove and clearance between said piston rod and said bearing surface defining a fluid path for relief of fluid from within said first chamber into said seal cavity during normal shock absorber operation, said resilient sealing element serving to prevent fluid leakage during such normal shock absorber operation.

3. In a direct acting hydraulic shock absorber the combination of a pressure cylinder, a piston located within said cylinder having the peripheral walls thereof slidably sealingly supported by said pressure cylinder to divide said pressure cylinder into a compression chamber and a rebound chamber, means defining a reservoir communicating with said compression chamber, a piston rod having one end connected to said piston and having the opposite end thereof extending exteriorly of said pressure cylinder through said rebound compartment, a rod guide element closing one end of said pressure cylinder having a concentric bore through which is directed said piston rod, said concentric bore including an entrance portion extending from one end of said rod guide to intersect a smaller diameter bore defining a bearing surface, said bearing surface supportingly engageable with the periphery of said piston rod to control lateral movement thereof during movement of said piston rod into and out of said pressure cylinder, a longitudinal bore through said piston rod, a side opening in said piston rod communicating said longitudinal bore with said rebound chamber, control means within said piston communicating said longitudinal bore with said compression chamber, said side opening, longitudinal bore and said control means being serially communicated to define a path for fluid flow from said rebound compartment into said compression chamber as said piston rod moves exteriorly of said pressure cylinder, a resilient annular seal encircling said piston rod including a plurality of axially spaced lips thereon to seal against fluid leakage from said rebound compartment during low-amplitude movement of said piston rod with respect to said pressure cylinder, said side opening being blocked by said first diameter portion of said bore on a maximum rebound movement of said piston rod to prevent fluid flow from said rebound chamber thereby to cut off further movement of said piston within said pressure cylinder and to increase the pressure within said rebound chamber, said bearing surface having a lower surface portion and an upper surface portion both located axially outwardly of the upper end of said pressure cylinder, means for sealing against fluid flow during rebound cutoff pressurization of said rebound chamber, said means including an annular groove formed in said smaller diameter portion of said rod guide around said piston rod at a point located between said upper and lower bearing surface portions and having an inner diameter greater than that of said upper and lower bearing surface portions, said annular groove only communicating with said rebound chamber through a clearance between the outer diameter of said piston rod and the inner diameter of said lower bearing surface portion, said annular groove only communicating with said seal cavity through a clearance between the outer diameter of said piston rod and the inside diameter of said upper bearing surface portion, said groove and said clearances between said piston rod and said upper and lower bearing portions preventing high-pressure flow impingement of fluid against said resilient seal element and consequent leakage across said seal.

* * * * *